Figure 1:
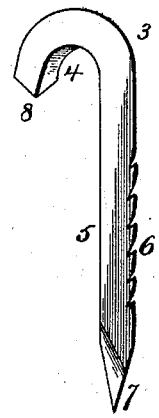
Figure 2:
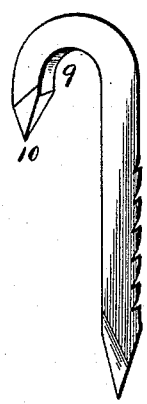
Figure 3:
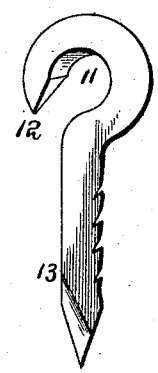
Figure 4:
Figure 5:
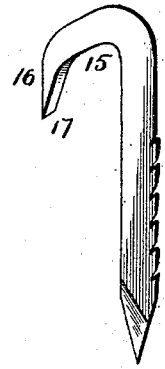
Figure 6:
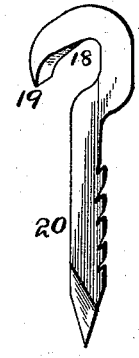
Figures 7, 8:
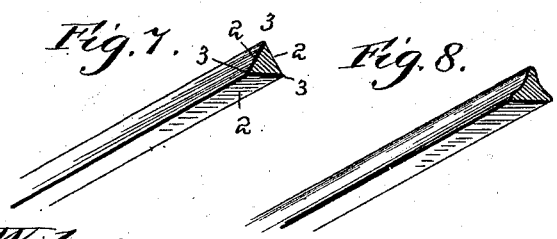
Figure 9:

(No Model.)

W. TAYLOR.
HOOK.

No. 498,890. Patented June 6, 1893.

Witnesses:
J. B. McGirr.
M. B. May

Inventor:
William Taylor
by Doubleday & Pliss
attys